United States Patent
Petrov

(10) Patent No.: US 9,965,307 B2
(45) Date of Patent: May 8, 2018

(54) BUILDING VIRTUAL APPLIANCES

(71) Applicant: VMware, Inc., Palo Alto, CA (US)

(72) Inventor: Andrey Todorov Petrov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 137 days.

(21) Appl. No.: 14/506,706

(22) Filed: Oct. 6, 2014

(65) Prior Publication Data

US 2016/0098288 A1 Apr. 7, 2016

(51) Int. Cl.
*G06F 9/455* (2006.01)
*G06F 9/445* (2018.01)
*G06F 9/50* (2006.01)

(52) U.S. Cl.
CPC ............ *G06F 9/45558* (2013.01); *G06F 8/61* (2013.01); *G06F 9/45533* (2013.01); *G06F 9/455* (2013.01); *G06F 9/5038* (2013.01); *G06F 2009/4557* (2013.01); *G06F 2009/45562* (2013.01)

(58) Field of Classification Search
CPC ......................................... G06F 9/455–9/5094
See application file for complete search history.

(56) References Cited

U.S. PATENT DOCUMENTS

| | | | | |
|---|---|---|---|---|
| 7,356,679 B1* | 4/2008 | Le | .................... | G06F 9/45558 717/176 |
| 7,890,689 B2* | 2/2011 | Lam | .................... | G06F 9/44505 711/118 |
| 8,683,464 B2* | 3/2014 | Rozee | .................... | G06F 8/61 718/1 |
| 9,043,786 B1* | 5/2015 | Hodge | .................... | G06F 9/45558 717/171 |
| 2008/0034364 A1* | 2/2008 | Lam | .................... | G06F 9/45533 718/1 |
| 2008/0215796 A1* | 9/2008 | Lam | .................... | G06F 9/44505 711/100 |
| 2010/0313200 A1* | 12/2010 | Rozee | .................... | G06F 8/61 718/1 |
| 2011/0004676 A1* | 1/2011 | Kawato | .................... | G06F 9/5044 709/221 |

(Continued)

OTHER PUBLICATIONS

Sun, Changhua et al., "Simplifying Service Deployment with Virtual Appliances," 2008, pp. 265-272.*

(Continued)

*Primary Examiner* — Thuy Dao
*Assistant Examiner* — Christopher J Franco
(74) *Attorney, Agent, or Firm* — Clayton, McKay & Bailey, PC

(57) ABSTRACT

An example method to build a virtual appliance for deployment in a virtualized computing environment may include obtaining a base virtual appliance that is application-independent. The base virtual appliance includes a virtual machine, a virtual disk associated with the virtual machine and a guest operating system (OS) installed on the virtual disk. The method may further comprise obtaining an application package associated with an application; and building the virtual appliance by assembling the base virtual appliance with the application package. During the assembly, the application package is installed on the virtual disk of the base virtual appliance such that the virtual machine supports both the guest OS and the application.

14 Claims, 6 Drawing Sheets

(56) References Cited

U.S. PATENT DOCUMENTS

| | | | | |
|---|---|---|---|---|
| 2012/0233606 A1* | 9/2012 | Amanuddin | ........ | G06F 9/45533 718/1 |
| 2012/0304168 A1* | 11/2012 | Raj Seeniraj | ......... | G06F 9/4445 718/1 |
| 2013/0130652 A1* | 5/2013 | Deasy | ..................... | G06F 9/455 455/411 |
| 2013/0131578 A1* | 5/2013 | Stalmans | ............ | A61F 9/00736 604/22 |
| 2013/0212161 A1* | 8/2013 | Ben-Shaul | ............ | G06F 9/4451 709/203 |
| 2014/0208316 A1* | 7/2014 | Ciano | ................... | G06F 9/4856 718/1 |
| 2014/0325514 A1* | 10/2014 | Benedetti | ............ | G06F 9/45533 718/1 |
| 2014/0359618 A1* | 12/2014 | Fontignie | ................ | G06F 9/455 718/1 |

OTHER PUBLICATIONS

Ibrahim, Amani S. et al., "CloudSec—A Security Monitoring Appliance for Virtual Machines in the IaaS Cloud Model," 2011, pp. 113-120.*
Tianfield, Huaglory et al., "Cloud Computing Architectures," 2011, pp. 1394-1399.*
Konstantinou, Alexander V. et al., "An Architecture for Virtual Solution Composition and Deployment in Infrastructure Clouds," 2009, pp. 9-17.*
Bairavasundaram, Lakshmi N. et al., "Responding Rapidly to Service Level Violations Using Virtual Appliances," 2012, pp. 32-40.*
Jin, X. et al., "Reinventing Virtual Appliances," 2009, pp. 1-15.*

* cited by examiner

410

```
1:  # The original system.vmdk is in a compressed format optimized for
2:  # streaming
3:  mv system.vmdk system.vmdk.compressed 4:  # Convert the appliance vmdk to a format that can be mounted r/w and
5:  # written to
6:  vmware-vdiskmanager -r system.vmdk.compressed -t 0 system.vmdk
```

```
1:  # Mounting virtual disk
2:  vmware-mount system.vmdk 2 /mnt/mountpoint

3:  # Customization (if any) of configuration files
4:  sed -r -i <expression> /mnt/mountpoint/etc/httpd/httpd.conf 5:  # Installation of application package
6:  rpm -Uvh --root /mnt/mountpoint /path/package.rpm 7:  # Unmounting virtual disk
8:  vmware-mount -d /mnt/mountpoint 9:  # Converting virtual disk to a suitable format
10: mv system.vmdk system.vmdk.writable
11: vmware-vdiskmanager -r system.vmdk.writable -t 5 system.vmdk
```

Fig. 4B

BUILDING VIRTUAL APPLIANCES

BACKGROUND

Unless otherwise indicated herein, the approaches described in this section are not admitted to be prior art by inclusion in this section.

Virtualization allows the abstraction of hardware resources and the pooling of these resources to support multiple virtual machines. For example, through virtualization, virtual machines with different operating systems may be run on the same physical machine. Each virtual machine is generally provisioned with virtual resources that provide similar functions as the physical hardware of a physical machine, such as central processing unit (CPU), memory and network resources to run an operating system and different applications.

In a virtualized computing environment, the utilization of virtual appliances represents a new way of deploying software applications. For developers and users, the benefits of virtual appliances include a reduction in development and distribution costs, accelerated time to market and the ability to leverage capabilities of different virtualization platforms. However, the building of virtual appliances may be a slow and complex process.

BRIEF DESCRIPTION OF DRAWINGS

FIG. 4A illustrates an example implementation of format conversion of a virtual disk of a base virtual appliance;

FIG. 4B illustrates an example implementation of assembling a base virtual appliance with an application package;

DETAILED DESCRIPTION

Figure 1:
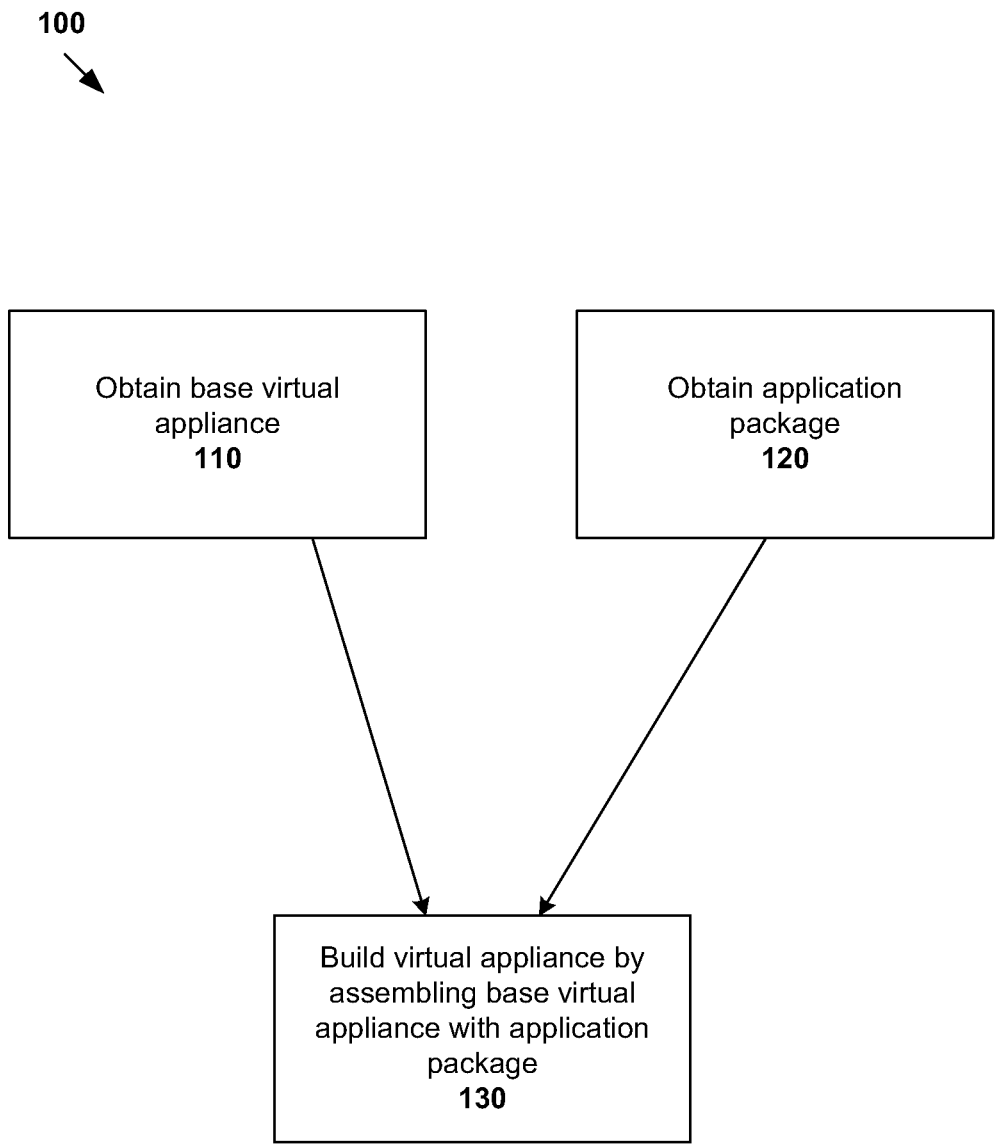
FIG. 1 is a flowchart of an example process for building a virtual appliance for deployment in a virtualized computing environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

According to examples of the present disclosure, the efficiency of building a virtual appliance may be improved using a base virtual appliance and an application package that may be developed incrementally and asynchronously. FIG. 1 is a flowchart of an example process for building a virtual appliance for a virtualized computing environment. Example process 100 may include one or more operations, functions, or actions illustrated by one or more blocks, such as blocks 110 to 130. The various blocks may be combined into fewer blocks, divided into additional blocks, and/or eliminated based upon the desired implementation.

Throughout the present disclosure, the term "virtual appliance" may generally refer to a pre-built software solution that includes one or more virtual machines that may be packaged, updated, maintained and managed as a unit. Example process 100 may be performed using any suitable computer system to build the virtual appliance. For example, the computer system may be a single user workstation, a client computing device, a server computing device, multiuser computing device, etc. The computer system may be one of multiple nodes in a build farm for developing and testing software applications. An example computer system for performing example process 100 will be described with reference to FIG. 6.

At block 110, example process 100 includes the computer system obtaining a base virtual appliance. The base virtual appliance is application-independent and includes a virtual machine, a virtual disk for the virtual machine, and a guest operating system (OS) installed on the virtual disk. The term "base virtual appliance" may generally refer to a virtual appliance that is not associated with a particular application and does not contain any application-specific information (i.e., "application-independent") such that it may be assembled with different application packages, or with different versions of the same application package. The term "obtaining" at block 110 is broadly used to include building, receiving (e.g., from an external device in communication with the computer system) and retrieving (e.g., from a storage device accessible by the computer system) the base virtual appliance.

At block 120, example process 100 includes the computer system obtaining an application package associated with an application. Similar to block 110, the term "obtaining" at block 120 is broadly used to include building, receiving (e.g., from an external device in communication with the computer system) and retrieving (e.g., from a storage device accessible by the computer system) the application package.

The term "application package" may generally include any suitable information associated with the application that facilitates installation of the application package on the virtual disk of the base virtual appliance. The application may be developed for any suitable purpose, such as to provide a service in the virtualized computing environment after the virtual appliance is deployed.

At block 130, example process 100 includes the computer system building the virtual appliance by assembling the base virtual appliance with the application package to install the application package on the virtual disk of the base virtual appliance. After the installation, the virtual machine of the virtual appliance supports the guest OS and application associated with the application package.

Using example process 100, the base virtual appliance and application package may be built incrementally and asynchronously (e.g., in parallel) before they are assembled. In practice, the base virtual appliance generally takes a long time to build, compared to the installation of the application package. Using a base virtual appliance that is application-independent, the base virtual appliance is reusable and capable of being assembled with different application packages to build different virtual appliances. Similarly, the application package is also reusable and capable of being assembled with different base virtual applications that, for example, have different OS settings. The reusability of the base virtual appliance and application package as building blocks in turns reduces the cost and complexity of the process of building the virtual appliance.

The reusability of the base virtual appliance and application package also reduces the need to build a virtual appliance from scratch every time a new application is developed. For example, without any reusable building blocks, it is generally necessary to repeat (e.g., time and time again) every single step required to build a virtual appliance, such as installing a guest OS in a newly provisioned virtual machine and installing an application package before exporting the virtual machine as a package.

Further, since the base virtual appliance includes a virtual disk on which the application package may be installed at block 130, it is not necessary to configure an additional virtual disk to hold the application package for installation at a later time, such as during the first boot of virtual appliance. Configuring the additional virtual disk during the first boot not only slows down the first boot, but also increases the footprint of the virtual appliance. By contrast, according to example process 100, the assembly process at block 130 does not require booting of the virtual disk of the virtual machine, and the application package is ready to be run after it is installed.

Figure 2:
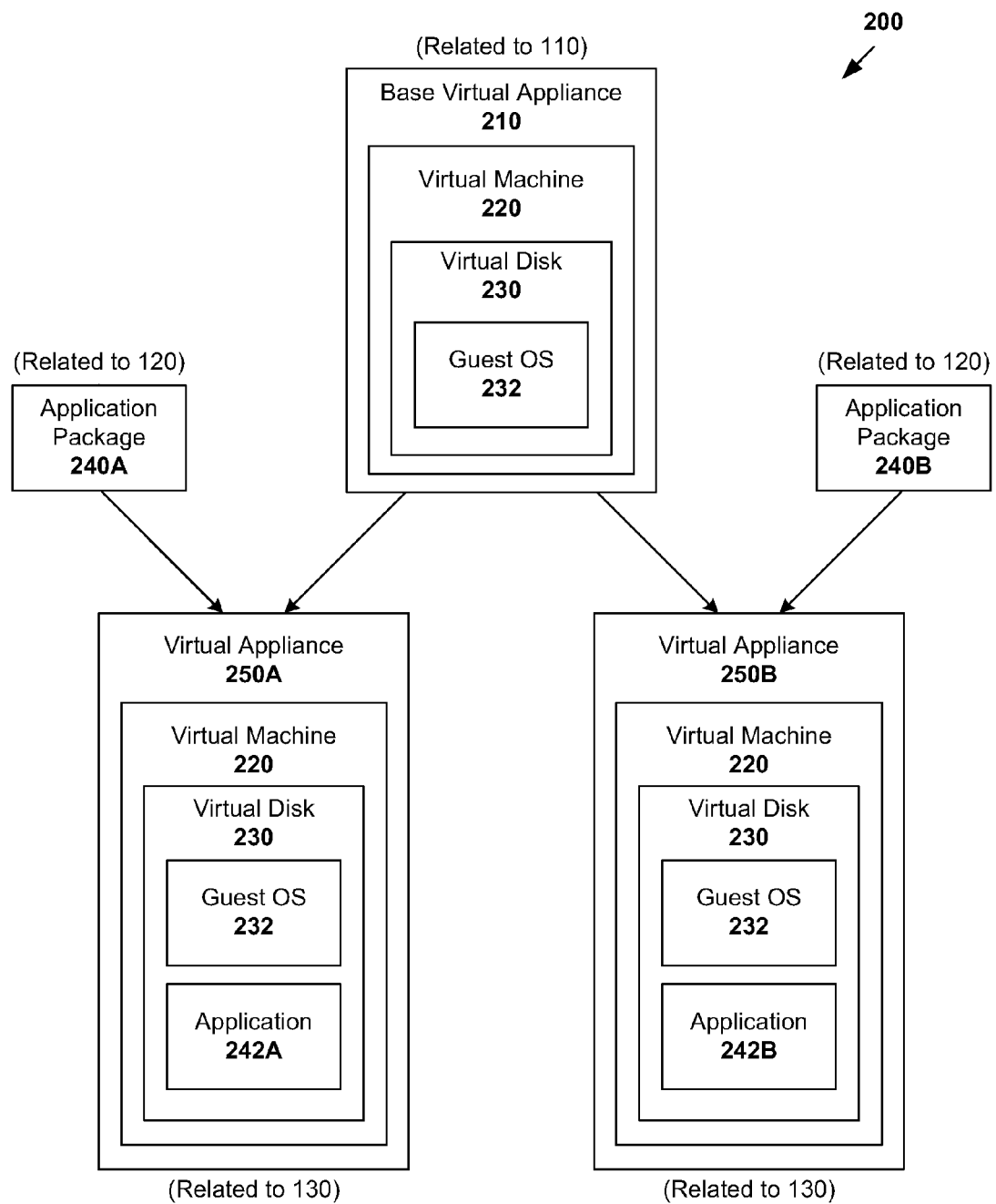
FIG. 2 is a schematic diagram illustrating an example base virtual appliance that is capable of being assembled with different example application packages to build different example virtual appliances.

Some examples are shown in FIG. 2, which is a schematic diagram illustrating example base virtual appliance 210 that is capable of being assembled with different example application packages 240A and 250B (two shown for simplicity) to build different example virtual appliances 250A and 250B. It should be understood that base virtual appliance 210, application packages 240A/240B and virtual appliances 250A/250B may include additional or alternative components, and may have a different configuration.

Base virtual appliance 210 does not include any application-specific information. Virtual disk 230 represents storage resources allocated to virtual machine 220 of base virtual appliance 210, such as to support guest OS 232, etc. In practice, there may be more than one virtual machine 220, as well as more than one virtual disk 230 for each virtual machine 220. For example, base virtual application 210 may include two virtual machines 220, and one or more application packages may be installed on each virtual machine 220. In addition, virtual disk 230 may hold a database, or a temporary or scratch area that may be initialized at this point.

Application package 240 may be built asynchronously from base virtual appliance 210. Two examples are shown FIG. 2, in which application package 240A is associated with application 242A, while application package 240B is associated with another application 242B. When application package 240A is installed on virtual disk 230, virtual appliance 250A includes base virtual appliance 210 with application 242A. Similarly, when application package 240B is installed, virtual appliance 250B includes base virtual appliance 210 and application 242B.

Although two examples are shown, it will be appreciated that base virtual appliance 210 may be assembled with other application packages 240. Further, complex multitier applications may span multiple virtual machines 220. In the following, application package 240A/240B will also be collectively referred to as "application packages 240" or individually as "application package 240." Application 242A/242B will be referred to as "applications 242" or "application 242." Virtual appliances 250A/250B will be collectively referred to as "virtual appliances 250" or individually as "virtual appliance 250."

Virtual appliance 250 may then be packaged in any suitable format for deployment in a virtualized computing environment. For example, Open Virtualization Format (OVF) is an open standard for packaging and distributing virtual appliances 250 to be run by a hypervisor. An OVF package may include several files placed in an OVF directory, such as an OVF descriptor file (e.g., describing contents and requirements of packaged virtual machine 520), metadata (e.g., name, hardware requirements, etc.) and a group of disk images. The OVF descriptor file may be in any suitable format such as extensible markup language (XML) format, and the OVF directory may be compressed and distributed as an Open Virtualization Appliance (OVA) file. The OVF standard generally requires that only compressed or optimized-for-streaming virtual disk 230 may be part of an OVF package.

In the following, base virtual appliance 210, application package 240 and virtual appliance 250 will be described in more detail with reference to examples in FIG. 3 and FIG. 4. Once assembled, virtual appliance 250 may be deployed in a virtualized computing environment, an example of which will be described with reference to FIG. 5.

Base Virtual Appliance 210

Figure 3:
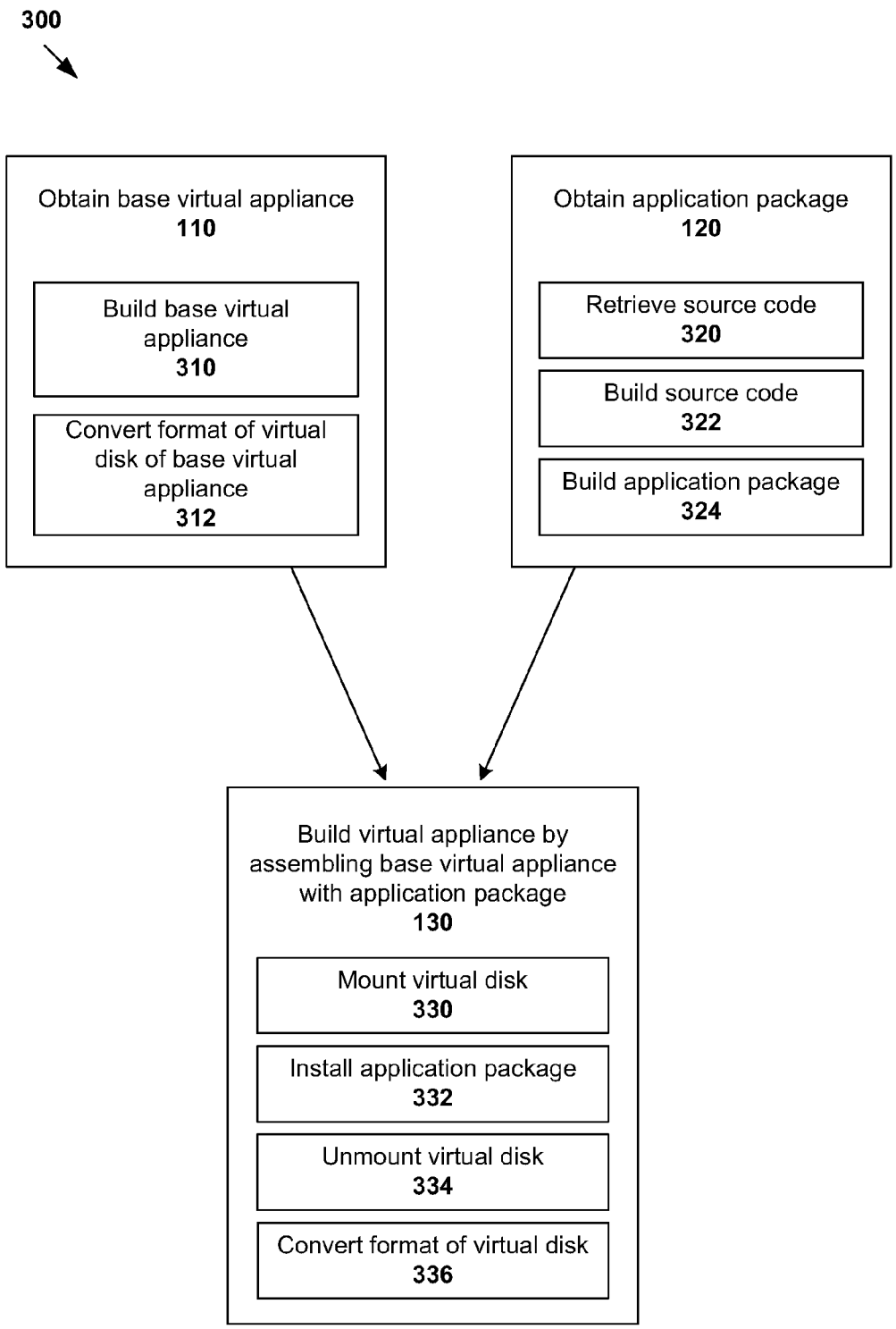
FIG. 3 is a flowchart of an example detailed process for building a virtual appliance according to the example process in FIG. 1.

FIG. 3 is a flowchart of example detailed process 300 for building virtual appliance 250 according to example process 100 FIG. 1. Example process 300 may include one or more operations, functions, or actions illustrated by one or more blocks, such as blocks 310-312 (related to 110 in FIG. 1), 320-324 (related to 120 in FIG. 1) and 330-336 (related to 130 in FIG. 1). The various blocks may be combined into fewer blocks, divided into additional blocks, and/or eliminated based upon the desired implementation.

Referring first to blocks 310 and 312 in FIG. 3, an example of how base virtual appliance 210 is obtained according to block 110 in FIG. 1 will be described. In this example, obtaining base virtual appliance 210 includes building base virtual appliance 210. However, it will be appreciated that base virtual appliance 210 may be received from an external device, or retrieved from any suitable data store or base virtual appliance repository accessible by a computer system implementing process 300.

At block 310 in FIG. 3, base virtual appliance 210 is built to include one or more virtual machines 220 (one shown for simplicity in FIG. 2). Each virtual machine 220 is allocated with virtual disk 230 on which guest OS 232 is installed. Virtual machine 220 is generally allocated with resources to support guest OS 232, such as CPU resources (e.g., processors), memory resources (e.g., random access memory), network resources (e.g., access networks, ports, etc.) and storage resources (e.g., virtual disk 230), etc. For example, the following may be specified for virtual machine 220: CPU architecture, number of CPUs, number of cores per CPU, number and size of disks, number and type of network interface cards, etc.

Installing guest OS 232 may include installing one or more associated OS packages. Each OS package may specify information relating to guest OS 232 of base virtual appliance 210. Any suitable OS package may be used, such as Bash (e.g., bash-3.2-147.18.1); GNU's Not Unix (GNU, a recursive acronym) core utilities or Coreutils (e.g., coreutils-8.12-6.25.29.1); GNU C Library or glibc (e.g., glibc-2.11.3-17.66.1); ip tables (e.g., iptables-1.4.6-2.11.4); GNU standard C++ library or libstdc (e.g., libstdc++6-4.7.2_20130108-0.17.2); stream editor or SED (e.g., sed- 4.1.5-85.22); and util-linux that provides low-level system utilities for a Linux system (e.g., util-linux-2.19.1-6.54.1). Although some examples are provided here, any suitable batch and version of the OS package may be used.

Depending on the requirements of virtual machine 220, each OS package may include any suitable customization. For example, a developer may edit configuration files of the OS package, such as to include customization relating to secure shell daemon (SSHD), hypertext transfer protocol daemon (HTTPD), firewall, etc.

When installing guest OS 232 on virtual disk 230, any installation approach may be used. For example, the installation may rely on International Organization for Standardization (ISO) images, which may be downloaded from an upstream mirror or from an internal software repository. An ISO image (e.g., extension .iso or .img relating to ISO 9660) is generally an archive file of an optical disc, a type of disk image composed of the data contents of every written sector of an optical disk. ISO images may be created using any suitable disk imaging approach, etc.

At block 312 in FIG. 3, once base virtual appliance 210 is built, its virtual disk 230 is converted to a format that allows installation of application package 240 according to block 130 in FIG. 1. For example, virtual disk 230 of base virtual appliance 210 is generally in a compressed format (as required by OVF) that is not modifiable. In this case, virtual disk 230 needs to be converted to a modifiable format, such as a read/write-mountable and writable format.

The format conversion may be made using a software utility that allows modification of virtual disk 230, such as using scripts or command line. An example is shown in FIG. 4A, which illustrates example implementation 410 of format conversion of virtual disk 230. At lines 1-3 in FIG. 4A, virtual disk 230 ("system.vmdk") is in a compressed format optimized for streaming. A temporary copy of virtual disk 230 (e.g., "system.vmdk") is made (e.g., "system.vmdk-.compresed") to prepare for the subsequent conversion.

At lines 4-6 in FIG. 4A, format conversion of virtual disk 230 is performed using a Virtual Disk Manager utility (e.g., "vmware-vdiskmanager"). In general, Virtual Disk Manager allows the creation, management and modification of virtual disk 230, such as from within a script or at the command line. Line 6 specifies a command with the following syntax: vmware-vdiskmanager <option parameter> <source disk> <target disk>. In this example, <option parameter> "-r" is to represent conversion of <source disk> to <target disk>; <source disk> is the temporary "system.vmdk.compressed" created at line 3 and <target disk> is "system.vmdk" having the desired format.

The desired format is specified using an option parameter of the Virtual Disk Manager utility, i.e. "-t 0" at line 6, which is a growable type contained in a single virtual disk file that is read/write-mountable. Once converted, the resulting base virtual appliance 210 (e.g., "system.vmdk" in FIG. 4A) cannot be deployed because virtual disk 230 is no longer in the compressed format required by OVF.

Although Virtual Disk Manager is used as an example here, it will be appreciated that any other suitable utility may be used for format conversion or for mounting virtual disk 230. For example, for kernel-based virtual machine (KVM), a disk image may be mounted with native utilities such as "losetup" and "mount", etc.

Application Package 240

Referring to blocks 320 to 324 in FIG. 3, an example of how application package 240 may be obtained according to block 120 in FIG. 1 will be described. In this example, application package 240 may be built from source code of application 242, and packaged in an appropriate format supported by guest OS 232 of base virtual appliance 210. However, it will be appreciated that obtaining application package 240 may involve receiving it from an external device, or retrieving it from a data store or application repository accessible by a computer system implementing process 300.

At block 320 in FIG. 3, source code in one or more files may be retrieved from a data store or repository. For example, the source code may be retrieved from a version control system, such as Git, Perforce, etc. The version control system generally stores a complete file and metadata history for the source code, which facilitates retrieval of a particular version of the source code.

At block 322 in FIG. 3, the retrieved source code is built using a build tool, which generally converts the source code into a different useful form. For example, the source code may be converted into software artifacts that may be run on virtual machine 220 when application package 240 is assembled with base virtual appliance 210. Any suitable build tool may be used, such as GNU Make, Autoconf, SCons, Maven, Makeit, Jam, Rake, Rant, etc.

At block 324 in FIG. 3, software artifacts produced during the build process at 324 are packaged in a format that is distributable and installable on base virtual appliance 210. The term "software artifact" may refer broadly to an item that is produced during a software development cycle. In relation to the build process, the software artifacts may include program libraries, build files, compiled source code, configuration files, etc. Any suitable format may be used, such as RPM Package Manager (RPM, a recursive acronym) with ".rpm" file extension; Debian package (DEB) with ".deb" file extension; archive file format ZIP with ".zip" file extension, tar archive with ".tgz" file extension, etc.

Application package 240 may be built for any suitable purpose in a virtualized computing environment, such as to facilitate replication or replication management; to support virtual infrastructure management or automation; to provide networking services; to implement virtual networked storage; etc. The resulting application package 240 may then be assembled with base virtual appliance 210 to create virtual appliance 250.

Virtual Appliance 250

Referring to blocks 330 to 336 in FIG. 3, an example of how virtual appliance 250 may be built according to block 130 in FIG. 1 will be described. Blocks 330 to 336 will be explained with reference to FIG. 4B, which illustrates an example implementation 420 of assembling base virtual appliance 210 with application package 240.

At block 330 in FIG. 3, virtual disk 230 of base virtual appliance 210 is first mounted to be able to install application package 240. Mounting virtual disk 230 allows it to be readable and writable, for example, as if virtual disk 230 were a separate file system with its own drive letter or "mount point." An example is shown at lines 1-2 in FIG. 4B, where a utility called Disk Mount (e.g., "vmware-mount") is used. In general, Disk Mount is a utility that allows developers to mount an unused partition of virtual disk 230 as a separate drive or partition without the need to connect to virtual disk 230 from within virtual machine 220. The command at line 2 indicates that "system.vmdk" is virtual disk 230 to be mounted; "2" indicates the partition number to be mounted; and "/mnt/mountpoint" is a path of where virtual disk 230 is mounted. Although Disk Mount has been used as an example here, any other suitable mount utility may be used. For example, some virtual disks formats such as Quick Emulator (QEMU) copy on write (QCOW) or QCOW2 may be mounted directly with a system mount utility called "mount".

In practice, after virtual disk 230 is mounted, a range of operating system utilities may be used to operate on virtual disk 230. Lines 3-4 in FIG. 4B shows an example where one or more configuration files of virtual disk 230 may be customized using any suitable utility (e.g., SED). In this example, a configuration file relating to HTTPD is customized. In practice, any suitable customization may be made based on the requirements of application package 240. For example, if application package 240 contains a web application, the system HTTPD may be configured to serve application package 240 (e.g., to enable modules, configure virtual hosts, etc.). In another example, if application package 240 is a network server, the system firewall may be configured to open up ports that application package 240 is listening on. Further, if application package 240 requires a database, customization may be made to initialize a new empty database instance for this purpose.

At block 332 in FIG. 3, after virtual disk 230 is mounted, application package 240 may be installed on the virtual disk 230. In the example in FIG. 4B, application package 240 is an RPM package (i.e. ".rpm" file extension). The installation may include extracting files from the RPM package, placing the files in appropriate places in the file system contained in virtual disk 230 and running suitable scripts, etc.

At lines 5-6 in FIG. 4B, an RPM command may be used to install application package 240. In this example, RPM command "rpm -Uvh" is to install application package 240, i.e. "U" is to install application package 240, and to show progress during the installation, "v" is to display status information while "h" is to print hash remarks. Command "--root /mnt/mountpoint" is to force RPM to use "/mnt/mountpoint" as the root directory during the installation, therefore installing application package 240 on mounted virtual disk 230.

At block 334 in FIG. 3, once application package 240 is installed, virtual disk 230 is unmounted. Unmounting virtual disk 230 disassociates virtual disk 230 from a mount point (e.g., "/mnt/mountpoint" at block 330), which in turns allows virtual machine 220 to access virtual disk 230, and therefore the installed application package 240. In practice, most file systems will require clean unmounting after they are written to. This is because data is often cached in memory (e.g., both reads and writes). Unmounting ensures that any data cached in memory is flushed to virtual disk 230 and prevents corruption of the file system. For example, the Disk Mount utility used according to block 330 (see lines 1-2) is used to unmount virtual disk 230. At lines 7-8 in FIG. 4B, command "vmware-mount -d" is to unmount virtual disk 230 at "/mnt/mountpoint." Command "vmware-mount -x" may also be used to unmount all partitions and close virtual disk 230.

Finally, at block 336 in FIG. 3, virtual disk 230 is converted to a format that is suitable for deploying virtual appliance 250, such as a compressed format required by the OVF standard. Similar to block 312, the Virtual Disk Manager utility may be used.

Referring to FIG. 4B again, line 10 is to create a copy of "system.vmdk" and name the copy as "system.vmdk.writable." Line 11 specifies a command with the following syntax: vmware-vdiskmanager <option parameter> <source disk> <target disk>. In this example, <option parameter> "-r" is to represent conversion of <source disk> to <target disk>; <source disk> is "system.vmdk.writable" and <target disk> is "system.vmdk" having the desired format. The desired format is specified using an option parameter of the Virtual Disk Manager utility, i.e. "-t 5" at line 11, which is a compressed disk optimized for streaming as required by the OVF standard.

Deployment of Virtual Appliance

Once virtual appliance 250 is built according to example process 100/300, virtual appliance 250 may be deployed in a virtualized computing environment. Virtual appliance 250 may be packaged in any suitable format for deployment, such as OVF, OVA, etc.

Figure 5:
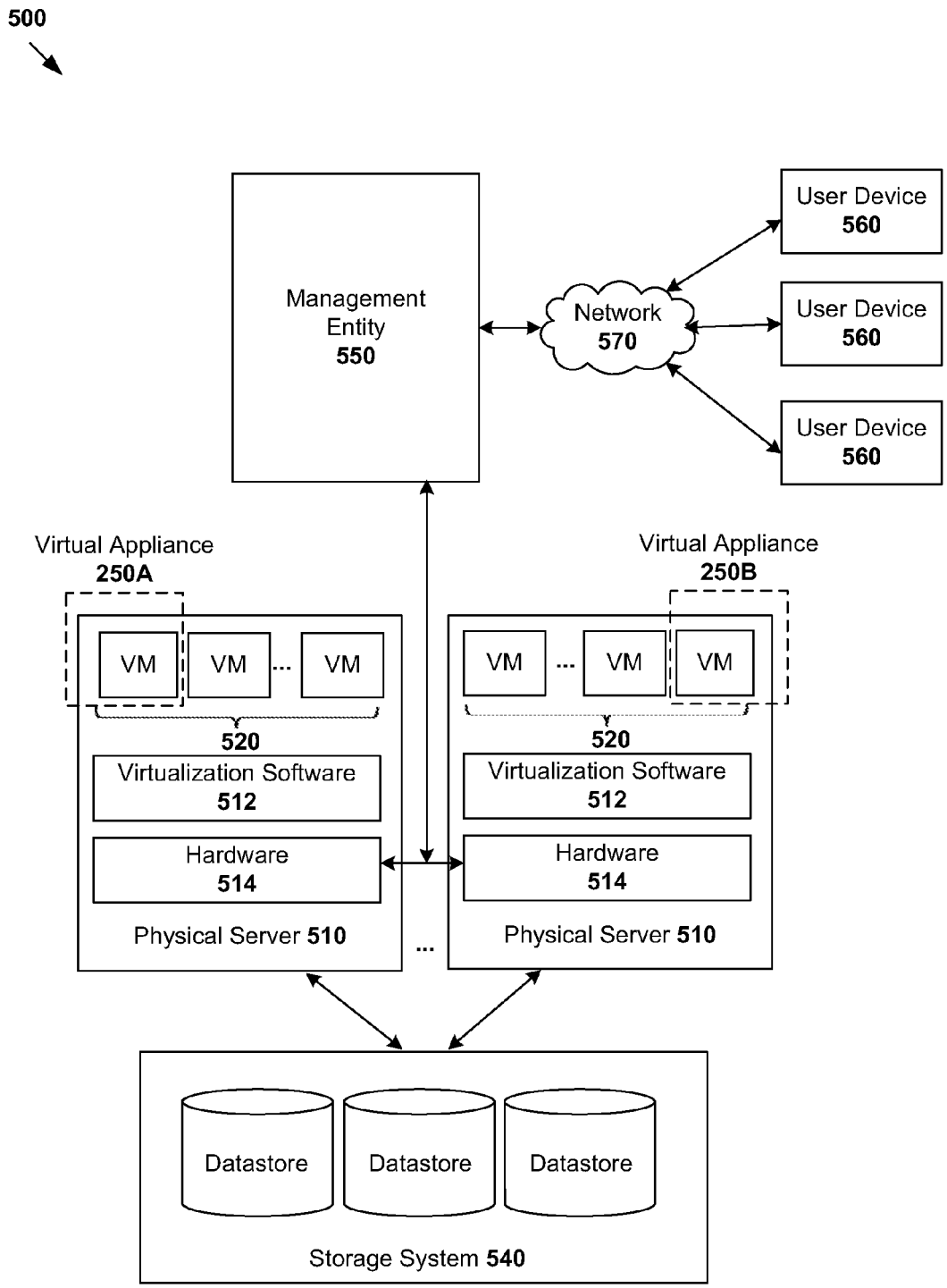
FIG. 5 is a schematic diagram illustrating an example virtualized computing environment in which a virtual appliance may be deployed.

FIG. 5 is a schematic diagram illustrating an example virtualized computing environment 500 in which virtual appliance 250 may be deployed. Although an example is shown, it should be understood that example virtualized computing environment 500 may include additional or alternative components, and may have a different configuration.

Virtualized computing environment 500 includes physical servers 510 (e.g., hosts). Each physical server 510 executes virtualization software 512 (e.g., hypervisor) and includes suitable hardware 514 to support multiple virtual machines 520. Virtualization software 512 maintains a mapping between resources allocated to virtual machines 520, and physical resources supported by physical servers 510 and storage system 540. In practice, there may be any suitable number of physical servers 510, each supporting any suitable number of virtual machines 520.

Virtual appliance 250 built according to the examples explained with reference to FIG. 1 to FIG. 4 may be deployed in virtualized computing environment 500. For example, referring to FIG. 2 again, virtual appliance 250A includes virtual machine 220 having guest OS 232 and application 242A installed on virtual disk 230. Similarly, virtual appliance 250B includes virtual machine 220 having guest OS 232 and application 242B installed on virtual disk 230. Once deployed, virtual disk 230 of virtual appliance 250A/250B is supported by storage system 540, in that data of virtual disk 230 is stored on one or more data stores of storage system 540. Further, hardware 514 (e.g., processors, network interface cards, etc.) of physical servers 510 provide CPU and network resources to virtual appliance 250A/250B.

Virtualized computing environment 500 further includes management entity 550, which is accessible by user devices 560 via network 570 to manage various objects (e.g., physical servers 510, virtual machines 520, virtual appliances 250, storage system 540, etc.). Management entity 550 generally provides various management functionalities for users to manage the various objects for any suitable purpose, such as deployment, provisioning, lifecycle management, maintenance, etc.

Computer System

Figure 6:
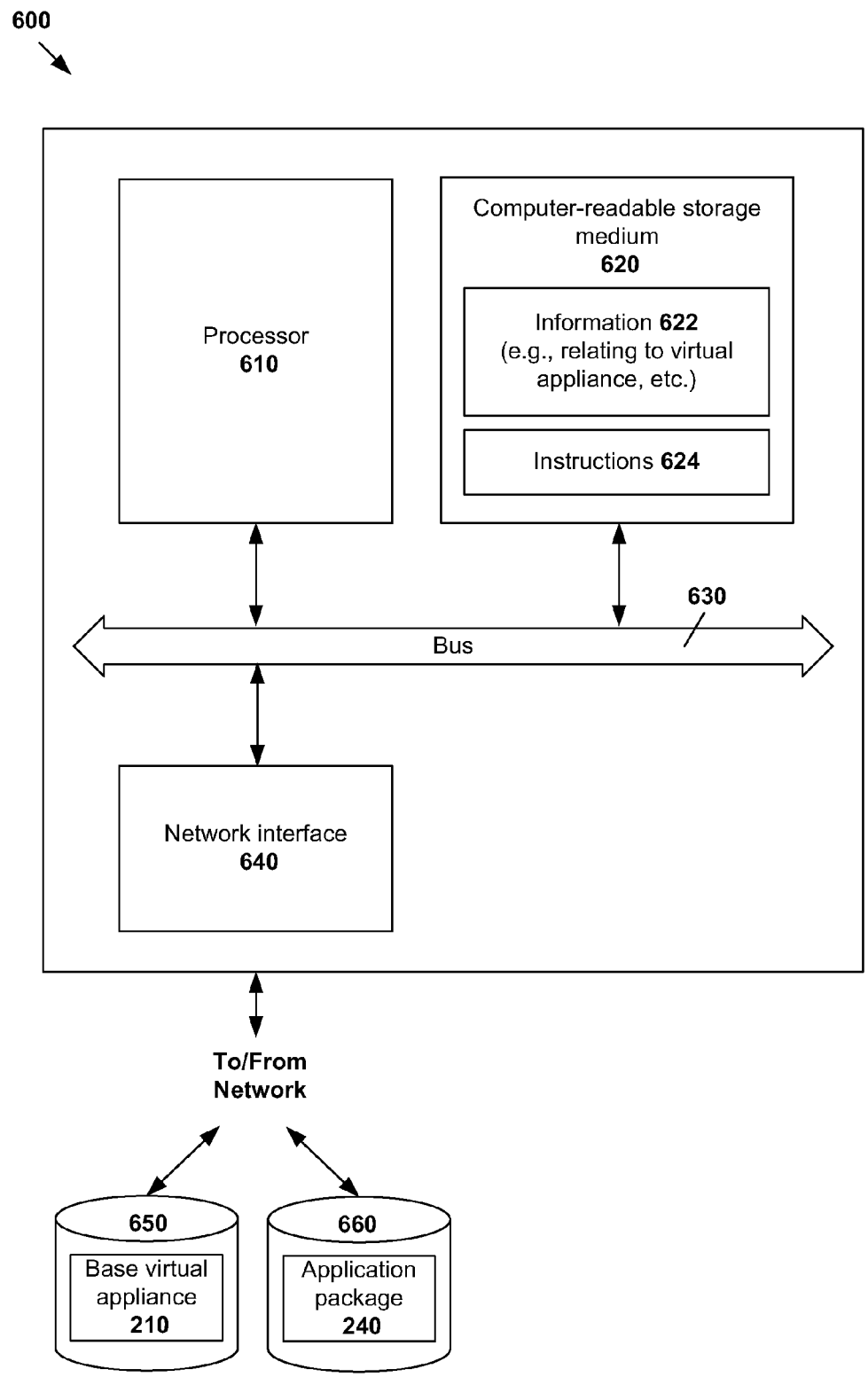
FIG. 6 is a schematic diagram illustrating an example computer system for building a virtual appliance for deployment in a virtualized computing environment.

The above examples can be implemented by hardware, software or firmware or a combination thereof. FIG. 6 is a schematic diagram of an example computer system 600 for building virtual appliance 250 for deployment in a virtualized computing environment. Example computer system 600 may include processor 610, computer-readable storage medium 620, network interface 640, and bus 630 that facilitates communication among these illustrated components and other components. Processor 610 is to perform processes described herein with reference to FIG. 1 to FIG. 5.

Computer-readable storage medium 620 may store any suitable information 622, such as information relating to base virtual appliance 210, application package 240, virtual appliance 250, etc. Computer-readable storage medium 620 may further store computer-readable instructions 624 which, in response to execution by processor 610, cause processor 610 to perform processes described herein with reference to FIG. 1 to FIG. 5.

As discussed with reference to FIG. 1 to FIG. 5, computer system 600 may "obtain" base virtual appliance 210 or application package 240 by building, retrieving or receiving base virtual appliance 210 or application package 240. For example, processor 610 may retrieve or receive base virtual appliance 210 from first data store 650, and application package 240 from second data store 660. Processor 610 may interface with data stores 650-660 via network interface 640. Although external data stores 650-660 are shown, they may also be internal data stores in practice, such as in the form of computer-readable storage medium 620. Further, data stores 650-660 may be combined into a single data store, such as a repository with a library of base virtual appliances 210 and application packages 240.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

I claim:

1. A method to build a virtual appliance for deployment in a virtualized computing environment, comprising:
    obtaining a base virtual appliance that is application-independent and includes a virtual machine, a virtual disk associated with the virtual machine and a guest operating system (OS) installed on the virtual disk, wherein the application-independent base virtual appliance is not associated with any application;
    obtaining an application package associated with an application; and
    after the virtual disk is converted from an unmodifiable format to a modifiable format that allows installation of the application package on the virtual disk, building the virtual appliance prior to initiation of the deployment of the virtual appliance in the virtual computing environment by:
    mounting the virtual disk in the modifiable format;
    customizing one or more configuration files of the virtual disk based on the application package; and
    installing the application package on the mounted virtual disk, wherein the virtual appliance is built by assembling the base virtual appliance with the application package such that the virtual machine supports both the guest OS and the application.

2. The method of claim 1, wherein obtaining the base virtual appliance comprises converting the virtual disk to a read/write-mountable format using a virtual disk manager utility.

3. The method of claim 1, wherein obtaining the base virtual appliance comprises:
    building the base virtual appliance by allocating the virtual disk to the virtual machine; and
    installing an OS package associated with the guest operating system on the virtual disk.

4. The method of claim 1, wherein building the virtual appliance further comprises:
    unmounting the mounted virtual disk after installing the application package; and
    converting the unmounted virtual disk into a format that is suitable for deployment of the virtual appliance in the virtualized computing environment.

5. The method of claim 4, wherein converting the unmounted virtual disk comprises:
    using a virtual disk manager utility to specify a compressed format required by Open Virtualization Format (OVF) and to convert the unmounted virtual disk into the compressed format.

6. The method of claim 1, wherein obtaining the application package associated with the application comprises building the application package by:
    converting source code of the application to software artifacts; and packaging the software artifacts in a format that is distributable and installable on the virtual disk of the base virtual appliance.

7. A non-transitory computer-readable storage medium that includes a set of instructions which, in response to execution by a processor, causes the processor to perform a method to build a virtual appliance for deployment in a virtualized computing environment, the method comprising:

obtaining a base virtual appliance that is application-independent and includes a virtual machine, a virtual disk associated with the virtual machine and a guest operating system (OS) installed on the virtual disk, wherein the application-independent base virtual appliance is not associated with any application;

obtaining an application package associated with an application; and after the virtual disk is converted from an unmodifiable format to a modifiable format that allows installation of the application package on the virtual disk, building the virtual appliance prior to initiation of the deployment of the virtual appliance in the virtual computing environment by:

mounting the virtual disk in the modifiable format;

customizing one or more configuration files of the virtual disk based on the application package; and installing the application package on the mounted virtual disk, wherein the virtual appliance is built by assembling the base virtual appliance with the application package such that the virtual machine supports both the guest OS and the application.

8. The non-transitory computer-readable storage medium of claim 7, wherein obtaining the base virtual appliance comprises converting the virtual disk to a read/write-mountable format using a virtual disk manager utility.

9. The non-transitory computer-readable storage medium of claim 7, wherein obtaining the base virtual appliance comprises:

building the base virtual appliance by allocating the virtual disk to the virtual machine, and installing an OS package associated with the guest operating system on the virtual disk.

10. The non-transitory computer-readable storage medium of claim 7, wherein building the virtual appliance further comprises:

unmounting the mounted virtual disk after installing the application package; and converting the unmounted virtual disk into a format suitable for deployment of the virtual appliance in the virtualized computing environment.

11. The non-transitory computer-readable storage medium of claim 10, wherein converting the unmounted virtual disk comprises:

using a virtual disk manager utility to specify a compressed format required by Open Virtualization Format (OVF) and to convert the unmounted virtual disk to the compressed format.

12. The non-transitory computer-readable storage medium of claim 7, wherein obtaining the application package associated with the application comprises building the application package by:

converting source code of the application to software artifacts; and packaging the software artifacts in a format that is distributable and installable on the virtual disk of the base virtual appliance.

13. A computer system for building a virtual appliance for deployment in a virtualized computing environment, wherein the computer system comprises:

a processor;

a non-transitory computer-readable storage medium having stored thereon instructions that, when executed by the processor, cause the processor to:

obtain a base virtual appliance that is application-independent and includes a virtual machine, a virtual disk associated with the virtual machine and a guest operating system (OS) installed on the virtual disk, wherein the application-independent base virtual appliance is not associated with any application;

obtain an application package associated with an application; and after the virtual disk is converted from an unmodifiable format to a modifiable format that allows installation of the application package on the virtual disk, build the virtual appliance prior to initiation of the deployment of the virtual appliance in the virtual computing environment by:

mounting the virtual disk in the modifiable format;

customizing one or more configuration files of the virtual disk based on the application package; and installing the application package on the mounted virtual disk, wherein the virtual appliance is built by assembling the base virtual appliance with the application package such that the virtual machine supports both the guest OS and the application.

14. The computer system of claim 13, wherein:

the computer system further comprises a network interface to interface with one or more data stores storing the base virtual appliance and the application package; and the instructions cause the processor to obtain, via the network interface, the base virtual appliance and the application package from the one or more data stores.

* * * * *